March 4, 1930.  S. L. GOLDSBOROUGH  1,749,532
RELAY SYSTEM
Filed July 2, 1925
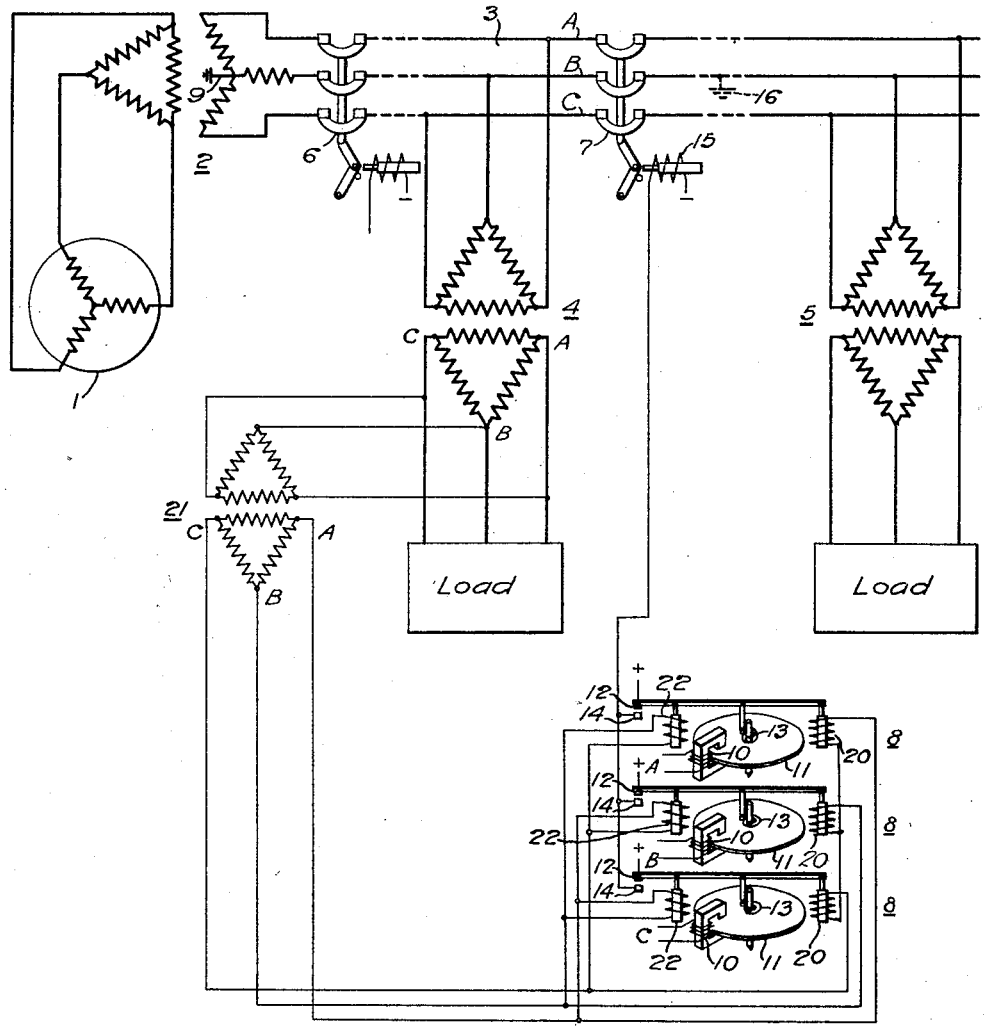
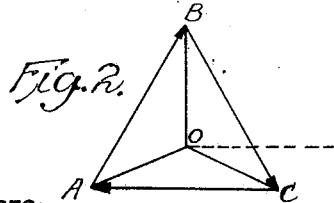
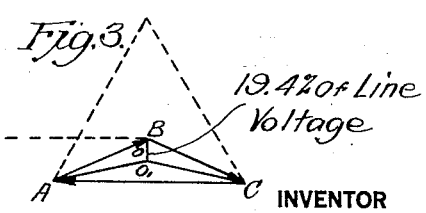
WITNESSES:
INVENTOR
Shirley L. Goldsborough
BY
ATTORNEY Patented Mar. 4, 1930

1,749,532

UNITED STATES PATENT OFFICE

SHIRLEY L. GOLDSBOROUGH, OF PITTSBURGH, PENNSYLVANIA, ASSIGNOR TO WESTINGHOUSE ELECTRIC & MANUFACTURING COMPANY, A CORPORATION OF PENNSYLVANIA

RELAY SYSTEM

Application filed July 2, 1925. Serial No. 41,173.

My invention relates to relay systems, and particularly to relay systems for the protection of grounded high-voltage electrical distribution circuits.

One object of my invention is to provide an improved selective relay system for the protection of polyphase systems having a grounded neutral that shall disconnect the faulty section of the system when a ground fault occurs thereon.

Another object of my invention is to provide, in connection with a high-voltage transmission circuit to which are connected load transformers for supplying the load, relays of such construction that they may be connected to low voltage secondary windings of the load transformers and will operate upon the occurrence of faults on the transmission circuit.

It is customary to connect the protective relays directly to the transmission circuit, but the cost of potential transformers for the transmission voltages commonly employed at the present time is prohibitive. By the use of the relay embodying my invention, the use of potential transformers is unnecessary.

In transmission systems having a grounded neutral, it is common practice to employ ungrounded transformer substations in some instances. Since these substations are located at various points in the distribution system, it is desirable to provide selective relay protection at each substation which, in the event that a fault occurs on the transmission circuit, disconnects only the faulty portion of the system and leaves the remaining substations in service.

In case the transmission circuit becomes grounded, however, the neutral of the ungrounded substation shifts in position. Consequently, if relays of the usual construction are connected directly to the secondary windings of the load transformers, the displacement of the neutral causes the relays to be incorrectly energized and selective operation is not obtained.

In accordance with my invention, each relay is provided with an additional voltage winding which modifies the operation of the relay in accordance with the displacement of the neutral when a ground fault occurs upon the transmission circuit, thus overcoming the above-mentioned difficulty. In my copending application Serial No. 41,172, filed July 2, 1925, I have disclosed and claimed a modified form of the invention in which the voltage applied to one of the windings of the relay is modified in accordance with the displacement of the neutral at the ungrounded substation.

In the accompanying drawing, Figure 1 is a diagrammatic view of a relay system embodying my invention; and Figs. 2 and 3 are vector diagrams illustrating voltage conditions obtaining on a portion of the circuit during normal and abnormal conditions, respectively.

The relationship between the voltages in the delta connected primary windings of a three phase transformer connected to a three phase system may be vectorially represented by a closed equilateral triangle, under normal conditions, as shown in Fig. 2.

A similar triangle will also represent vectorially, under normal conditions, voltages in the secondary windings if they are also delta connected.

If voltage is removed from a conductor of the three phase grounded system, which is substantially the condition that occurs when the conductor becomes grounded, the vector triangle of the primary voltages collapses to an isosceles triangle whose upper vertex coincides with the neutral point of the normal triangle, as indicated in Fig. 3.

Similarly, the secondary voltage triangle collapses to a similar isosceles triangle.

A difference is observed in the voltages, however, that obtain between points corresponding to the vertices of the triangles and the artificial neutral point. In the primary vector triangle, the voltage between the artificial neutral and the vertex corresponding to the grounded conductor disappears. The vertex and the neutral point co-incide. In the secondary triangle, however, there is nothing to definitely tie the line potential and the neutral potential together, and, consequently, the neutral shifts to a new position ($O_1$) relative to the vertex representing the potential of the faulty conductor.

The secondary vector triangle therefore indicates an apparent voltage on the faulty conductor. The change in the potential of the secondary neutral, under these conditions, is 19.4% of the normal phase voltage. In order to obtain a true indication of the potential of a conductor on the primary side of the transformers, it is therefore necessary to modify the indication derived from the secondary side of the transformers to compensate for such apparent voltage.

I provide such compensation by counter-balancing each voltage force corresponding to a line voltage, by a voltage force having a value of about 19.4% or roughly 20% of normal.

The principle of the impedance relay which I use involves a current element operated by the load or faulty current, and a voltage element which restrains the moving member, usually a disc, which is operated by the current element. Since the voltage adjacent the faulty region will be relatively low, the restraining effect will be small and the corresponding relay will be operated more quickly than any other relay. Such a relay automatically adjusts its operating period according to its distance from the fault.

I employ such a relay in my system, but, in order to adapt it to the different conditions therein, I provide a second potential element to compensate for the apparent voltage condition established by the main transformers. That potential element counteracts the potential element by a force corresponding substantially to 19.4% normal voltage.

Thus, where no voltage exists on a primary conductor due to a ground thereon, and the corresponding relay potential element indicates a voltage of 19.4% normal value, the second potential element neutralizes and corrects that effect to establish an effect corresponding to the true condition in the primary circuit.

Since, during faulty conditions there will be no voltage on the faulty conductor, I derive an energizing voltage for the secondary potential element from a phase other than that energizing the main potential element.

Referring to the drawing, an electrical distribution system is shown comprising a three-phase generator 1, a transformer 2 and a high-voltage transmission circuit 3 to which are connected step-down transformers 4 and 5. The transformers 4 and 5 may be located in separate substations a considerable distance from each other and from the generating station, as indicated by the dotted portions of the transmission circuit 3. Circuit-interrupters 6 and 7 are disposed between the respective stations in order that, upon the occurrence of a fault effecting the more distant substations, only the faulty section of the circuit 3 is disconnected from service. A series of ground relays 8 are provided for controlling the circuit-interrupter 7 and are so connected in the respective phases of the circuit as to be operatively energized if one of the conductors of the transmission circuit becomes grounded.

The neutral point of the secondary windings of the transformer 2 is grounded, as indicated at 9, in accordance with usual practice. However, the substations containing the transformers 4 and 5 are ungrounded substations.

The relays 8 are of the impedance type of which one form is disclosed and claimed in the co-pending application of L. N. Crichton, Serial No. 641,701, filed May 26, 1923, and assigned to the Westinghouse Electric & Mfg. Co. Each relay comprises a current-actuating element 10, an armature member 11 controlled thereby and a movable contact member 12 connected through a coiled spring 13 to the armature member 11. The details of construction may be similar to those shown in the above-mentioned application of L. N. Crichton. The movable contact member 12 is adapted to cooperate with a fixed contact member 14 when the relay 8 is operatively energized. The engagement of the contacts 12 and 14 energizes the trip coil 15 of the circuit-interrupter 7, thereby opening the circuit.

It will be understood that the substation containing the transformer 5 will be equipped with a similar group of relays if the transmission circuit 3 extends beyond this substation. A similar group of relays is also provided at the generating station for controlling the circuit interrupter 6, upon the occurrence of a fault at the transmission circuit. This group of relays may be of any usual type, but are, preferably, of the impedance type and so timed with respect to the relays 8 that, in case of a fault, such as indicated at 16, affecting both groups of relays, the circuit-interrupter 7 will be tripped first and leave the transformer 4 connected in service.

The connections of the relays 8 and the construction of these relays form an important part of my invention and the same, as shown in the drawing, will be described in detail. However, the exact construction and arrangement shown is only intended to be illustrative, as various modifications thereof will occur to those skilled in the art.

Each relay 8 comprises restraining means for opposing the torque exerted by the current element 10 upon the contact member 12 in order to modify the element of the relay in a desired manner. In the form shown, the restraining means comprises a solenoid 20 connected to a potential transformer 21, the primary winding of which is connected to the low-voltage secondary winding of the transformer 4. The current elements 10 of the relay are connected to current transformers in the respective phase conductors A, B and C of the transmission circuit, as indicated. The actual connection of these elements to the appropriate phase conductors is not shown, for the purpose of clearness, but the connections are obvious.

Although there is no difficulty in insulating current transformers for high voltages, the cost of potential transformers for the voltages ordinarily used for the transmission of power is prohibitive. Accordingly, a relatively low-voltage potential transformer 21 is employed that is connected to the low-voltage secondary winding of the transformer 4. However, since the substation does not have a grounded neutral, the neutral is shifted when a ground, as indicated at 16, occurs upon the transmission circuit, and if this were not taken into account, the energization of the relays 8 would depend upon factors other than the location and type of fault, and selective operation of the substation relays with respect to the generating station relays would not be obtained.

To avoid this difficulty, I have provided a second solenoid 22 which opposes the torque of the first-mentioned solenoid 20 and which is approximately one-fifth the strength thereof. The solenoid 22 is energized from the two phases that are not affected by the fault and, therefore, exerts a constant torque. Thus if we assume a fault on the conductor B, as indicated in the drawing, the voltage winding 20 of the middle relay 8 will be energized. The voltage winding 22 of said relay is connected to the phases A and C which are not affected by the fault and, therefore, have a constant potential.

Since the displacement of the neutral of the secondary winding of the transformer 4 may reach the value of 19.4% of the line voltage, if the resistance in the ground circuit is very small, the ampere-turns of the solenoid 22 are so chosen with respect to the ampere-turns of the solenoid 20 that the desired correction is obtained for this condition. If the ground resistance is greater, the displacement of the neutral is correspondingly less and the increased current through the solenoid 20 is such as to obtain the desired time characteristic of the relay.

Since the operation of the relays 8 is the same as if the contact member 12 was controlled in accordance with the potential on the transmission circuit 3, it is evident that selective operation of the relays in the respective stations of the system is obtained without the necessity of providing potential transformers insulated for the voltage of the transmission circuit 3.

I claim as my invention:

1. In an electrical system, the combination with a main circuit, of a relay connected to said circuit comprising a current element energized in accordance with the current traversing the circuit, and a plurality of voltage elements one of which is energized in accordance with the actual value of a voltage in the circuit when it is affected by a fault upon one conductor thereof, and another of which is energized in accordance with an apparent value of a voltage in the circuit under such conditions.

2. In an electrical system, the combination with a polyphase transmission circuit having a grounded neutral, and an ungrounded transformer connected thereto for supplying a relatively low-voltage load, of a relay so connected to said circuit as to be operated upon the occurrence of a fault on the transmission circuit, said relay including a plurality of voltage windings connected entirely on the low-voltage side of the windings of said transformer.

3. In an electrical system, the combination with a polyphase transmission circuit having a grounded neutral, a substation, and an ungrounded transformer in said substation for supplying a relatively low-voltage load from said transmission circuit, of a relay responsive to a ground-fault on one phase of the circuit, said relay having an actuating winding connected to the circuit, a restraining winding connected to the low-voltage winding of said transformer and a second winding opposing said first-mentioned restraining winding and connected to points on the low-voltage windings corresponding to unaffected phases of the transmission circuit.

4. In an electrical system, the combination with a grounded transmission system and an ungrounded transformer at a substation, of means for isolating a faulty section of the transmission system comprising a current responsive element energized in accordance with the system current, means energized from the low tension side of the transformer for restraining the current-responsive element in accordance with the voltage in the transmission system at the corresponding region in the high tension side, and means for modifying the restraining effect of said restraining means to compensate for disproportionate changes in voltage on the low tension side of the transformers with changes in voltage on the high tension side due to circuit conditions.

5. A relay comprising a current winding, an opposed voltage winding, a second voltage winding for modifying the effect of the first-mentioned voltage winding, and contact members controlled by said current and voltage windings.

6. A relay comprising an induction disc element and a current-responsive winding for effecting the movement thereof, a contact member, means for controlling the movement of said contact member in accordance with the movement of said disc element, means including a second winding for restraining the movement of said contact member, and means for modifying the restraining effect of said second winding.

In testimony whereof, I have hereunto subscribed my name this 29th day of June, 1925.

SHIRLEY L. GOLDSBOROUGH.